United States Patent
Lee et al.

(10) Patent No.: US 8,355,231 B2
(45) Date of Patent: Jan. 15, 2013

(54) APPARATUS AND METHOD FOR PROTECTING BATTERY PACK BY DETECTING DESTRUCTION OF SENSE RESISTOR IN BATTERY PACK

(75) Inventors: Jonathan Lee, Chungbuk (KR); Jin-Hyun Lee, Chungbuk (KR)

(73) Assignee: LG Chem, Ltd., Seoul (KR)

( * ) Notice: Subject to any disclaimer, the term of this patent is extended or adjusted under 35 U.S.C. 154(b) by 238 days.

(21) Appl. No.: 12/664,501

(22) PCT Filed: Sep. 8, 2009

(86) PCT No.: PCT/KR2009/005081
§ 371 (c)(1),
(2), (4) Date: Dec. 14, 2009

(87) PCT Pub. No.: WO2010/055994
PCT Pub. Date: May 20, 2010

(65) Prior Publication Data
US 2011/0228436 A1 Sep. 22, 2011

(30) Foreign Application Priority Data
Nov. 14, 2008 (KR) .................. 10-2008-0113147

(51) Int. Cl.
*H02H 5/04* (2006.01)
(52) U.S. Cl. ........................................ 361/104
(58) Field of Classification Search ........... 361/104
See application file for complete search history.

(56) References Cited

U.S. PATENT DOCUMENTS

| 5,867,008 | A | * | 2/1999 | Du et al. | 320/136 |
| 7,479,894 | B2 | | 1/2009 | Song | |
| 8,049,469 | B2 | * | 11/2011 | Kim | 320/153 |
| 2009/0085521 | A1 | * | 4/2009 | Kim | 320/134 |
| 2011/0045323 | A1 | * | 2/2011 | Ooi et al. | 429/50 |

FOREIGN PATENT DOCUMENTS

| KR | 10-2005-0026360 A | 3/2005 |
| KR | 10-2006-0019772 A | 3/2006 |
| KR | 10-2006-0022558 A | 3/2006 |
| TW | 516261 | 1/2003 |
| TW | 200701585 | 1/2007 |
| WO | 99/56374 A1 | 11/1999 |

* cited by examiner

*Primary Examiner* — Ronald W Leja
(74) *Attorney, Agent, or Firm* — Birch, Stewart, Kolasch & Birch, LLP

(57) ABSTRACT

An apparatus for protecting a battery pack includes a fuse and a sense resistor, connected on a circuit path along which a charging or discharging current flows, and a fuse control switch for controlling the fuse. Also, the apparatus further includes a Schottky diode having one end connected to the sense resistor and the other end connected to the fuse control switch. Thus, destruction of a sense resistor serving an important role in the battery pack protecting apparatus is detected to melt and cut the fuse, thereby preventing any element from being damaged due to overcurrent and thus improving the safety of a battery pack at a low cost.

3 Claims, 3 Drawing Sheets

--PRIOR ART--

APPARATUS AND METHOD FOR PROTECTING BATTERY PACK BY DETECTING DESTRUCTION OF SENSE RESISTOR IN BATTERY PACK

TECHNICAL FIELD

The present invention relates to apparatus and method for protecting a battery pack, and more particularly to apparatus and method for protecting a battery pack by detecting destruction of a sense resistor of the battery pack.

BACKGROUND ART

In recent, the demands on portable electronic products such as notebooks, video cameras and cellular phones are rapidly increased, and the development of electric vehicles, energy storage batteries, robots and satellites is under active progress. Accordingly, high-performance secondary batteries capable of being repeatedly charged are vigorously researched.

Currently, nickel-cadmium batteries, nickel-hydrogen batteries, nickel-zinc batteries and lithium secondary batteries are commercially available as secondary batteries. Among them, lithium secondary batteries are spotlighted since they may be freely charged or discharged since memory effects are scarcely caused in comparison to nickel-based secondary batteries. In addition, lithium secondary batteries exhibit very low self-discharge and high energy density.

Meanwhile, the most important issue in relation to batteries is the safety. In particular, notebooks and cellular phones are used more and more, and if a battery is exploded, a portable electronic product having the battery may be broken and even cause a fire. Thus, the safety of a battery should be ensured. Until now, various kinds of protecting apparatuses have been used to ensure the safety of a battery. Such a protecting apparatus intercepts a charging/discharging current to ensure the safety of a battery if an abnormal state was detected in a battery. In generally, the battery pack protecting apparatus includes a fuse for irreversibly breaking a line along which a charging/discharging current is flowing so as to intercept the current flow and thus protect a battery pack in case an abnormal state such as overcharging, overdischarging, short circuit and overcurrent happens, and a sense resistor for detecting a magnitude of the charging/discharging current.

FIG. 1 is a block diagram schematically showing a conventional battery pack protecting apparatus.

Referring to FIG. 1, a conventional battery pack protecting apparatus 100 is connected to a cell group 20 composed of at least one battery cell, and the conventional battery pack protecting apparatus 100 includes a high voltage output terminal Pack+ and a low voltage output terminal Pack− connected to a charging device or a load, a charge control switch 60 and a discharge control switch 50 respectively connected to a high voltage line in series to intercept a charging current and a discharging current when overcharging or overdischarging occurs, a sense resistor 10 connected to a low voltage line in series to sense a current flowing in the protecting apparatus 100, a fuse 40 for irreversibly breaking a line along which a charging/discharging current is flowing in case an abnormal state such as overcharging and overdischarging occurs in a battery, a fuse control switch 30 for selectively opening or closing the flow of current used for operating the fuse 40, a first protective circuit 80 for sensing an individual cell voltage and outputting the sensed voltage to a microcontroller 90, a second protective circuit 70 for sensing an individual cell voltage and applying an operation voltage to the fuse control switch 30 to melt and cut the fuse 40 when an overcharging state over a critical value is detected, and a microcontroller 90 for receiving the voltage of each cell from the first protective circuit to monitor whether the entire cells or individual cells are overcharged, sensing a charging/discharging current of the battery through the sense resistor 10 to monitor whether overcurrent occurs, and, when an abnormal state such as overdischarging or overcurrent is detected, controlling ON/OFF operation of each switch 30, 50, 60 to temporarily or permanently intercept the flow of charging/discharging current.

The charge control switch 60, the discharge control switch 50 and the fuse control switch 30 are made of FET (Field Effect Transistor) having a parasitic diode therein. The charge control switch 60 and the discharge control switch 50 receive an operation voltage at their gate terminals from the first protective circuit 80 under the control of the microcontroller 90. Also, the fuse control switch 30 receives an operation voltage at its gate terminal from the microcontroller 90 or the secondary protective circuit 70.

In addition, the fuse 40 is configured as a three-terminal fuse. In case an individual cell or a cell group 20 is overcharged or overdischarged beyond a limit since the charge control switch 60 or the discharge control switch 50 is damaged not to normally control charging or discharging, in case an overcurrent is flowed since a short circuit is caused in a load or a protecting apparatus, or in case an abnormal state such as abrupt increase or decrease of a charging voltage happens since an individual cell is damaged, the fuse 40 irreversibly breaks the line along which the charging/discharging current flows (namely, the line of the Pack+ terminal) to prevent explosion of the battery pack, permanent damage of the battery cell, or breakdown of a load connected to the battery pack.

Meanwhile, as the power consumption of a battery pack demanded in a high-power battery system is increased recently, the capacities consumed by safety-related parts used in the battery pack are also increased, and accordingly a current capacity of the three-terminal fuse also tends to increase from 7 A to 12 A. If an external short circuit or an overcurrent occurs in this circumstance, the fuse may be melted and cut later, so important parts located on a main current path may be broken down before the fuse is melted and cut. In particular, if the sense resistor 10 serving an important role in the battery pack protecting apparatus is broken due to overcurrent or the like, a great voltage is applied to both ends of the sense resistor 10, so an overvoltage exceeding an allowable limit may be applied to the microcontroller 90. In this case, the microcontroller 90 may be damaged not to apply an operation voltage to the fuse control switch 30 and thus not to melt and cut the fuse 40, which is essential for the protecting operation. As a result, a little current is consistently flowed until the battery is entirely discharged, and in this process, a battery temperature is increased, which may cause even a fire to the battery in a serious case.

DISCLOSURE

Technical Problem

The present invention is designed to solve the problems of the prior art, and therefore it is an object of the present invention to provide apparatus and method for protecting a battery pack, which may improve the safety of a battery pack by detecting destruction of a sense resistor serving an important role of the battery pack protecting apparatus and then melting and cutting a fuse.

Technical Solution

In order to accomplish the above object, the present invention provides an apparatus for protecting a battery pack, which includes a fuse and a sense resistor, connected on a circuit path along which a charging or discharging current flows, and a fuse control switch for controlling the fuse, wherein the apparatus further includes a Schottky diode having one end connected to the sense resistor and the other end connected to the fuse control switch.

In another aspect of the present invention, there is also provided a battery pack, which includes a battery cell group having at least one battery cell, the battery pack protecting apparatus electrically coupled to the battery cell group, and a housing for receiving the battery cell group and the battery pack protecting apparatus in an inner space.

In still another aspect of the present invention, there is also provided a method for protecting a battery pack, which includes a fuse and a sense resistor, connected on a circuit path along which a charging or discharging current flows, a fuse control switch for controlling the fuse, and a Schottky diode connected between the sense resistor and the fuse control switch, the method including: (S1) allowing an electric current to flow toward the fuse control switch through the Schottky diode, in case a voltage over a predetermined value is applied to both ends of the sense resistor; and (S2) turning on the fuse control switch by the electric current to melt and cut the fuse.

Advantageous Effects

According to the present invention, destruction of a sense resistor serving an important role in a battery pack protecting apparatus is detected to melt and cut a fuse, thereby preventing any element from being damaged due to overcurrent and thus improving the safety of a battery pack at a low cost. In particular, as the power consumption of a battery pack demanded in a high-power battery system is recently increased, the sense resistor may be destructed before the fuse is melted and cut, when overcurrent occurs. In this case, the fuse may not be melted and cut. However, in the present invention, in case the sense resistor is destructed before the fuse is melted and cut, it is possible to detect the destruction of the sense resistor and then melt and cut the fuse. Thus, the present invention may protect parts, prevent any accident caused by heating or firing, and protect data stored in a system employing a battery pack.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
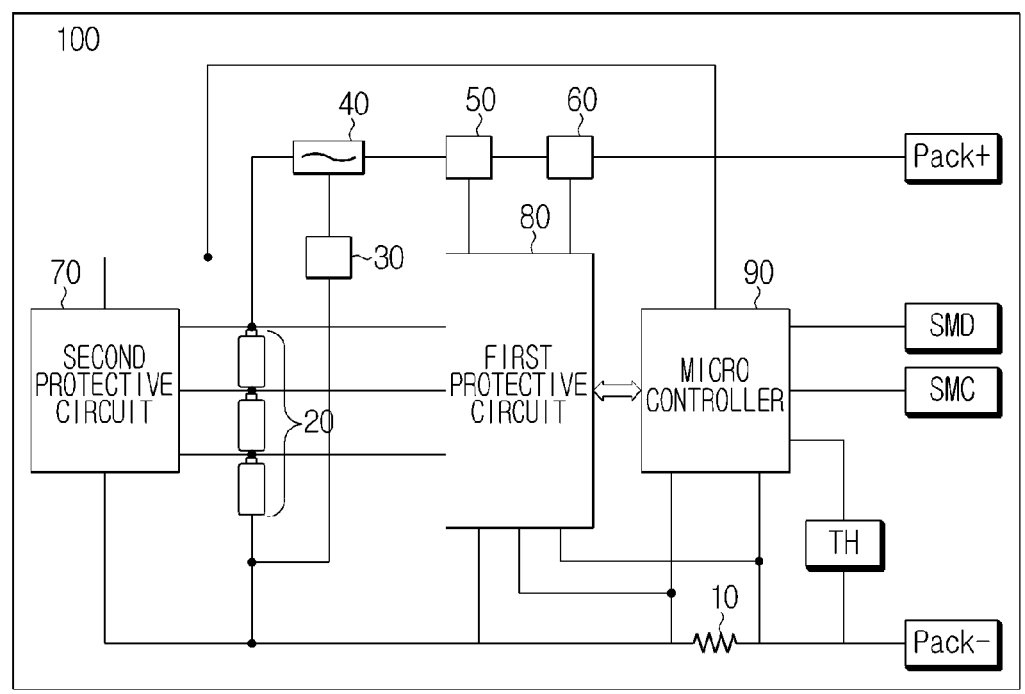
FIG. 1 is a block diagram schematically showing a conventional battery pack protecting apparatus.
Figure 2:
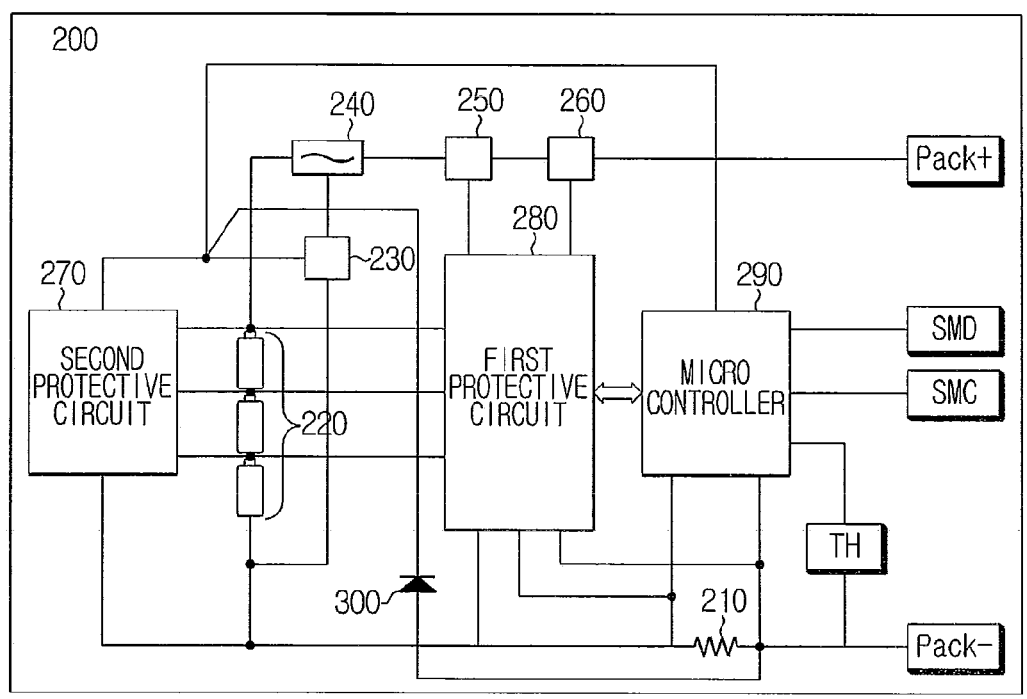
FIG. 2 is a block diagram schematically showing an apparatus for protecting a battery pack according to a preferred embodiment of the present invention.

FIG. 2 is a block diagram schematically showing an apparatus for protecting a battery pack according to a preferred embodiment of the present invention.

Referring to FIG. 2, the battery pack protecting apparatus 200 according to the present invention is connected to a cell group 220 composed of at least one battery cell, and the battery pack protecting apparatus 200 includes a charge control switch 260 and a discharge control switch 250 configured to control a charging current and a discharging current, a fuse 240 for irreversibly breaking a line along which a charging/discharging current flows, a fuse control switch 230 for selectively opening or closing an operation current flowing to the fuse, a sense resistor 210 installed at a line along which a charging/discharging current flows so as to measure a charging/discharging current of a battery, a first protective circuit 280 for sensing an individual cell voltage and outputting the sensed voltage to a microcontroller 290, a second protective circuit 270 for sensing an individual cell voltage and applying an operation voltage to the fuse control switch 230 to melt and cut the fuse 240 when an overcharging state over a critical value is detected, and a microcontroller 290 for controlling overall operations of the protecting apparatus 200 using each switch 230, 250, 260.

Here, basic operations of each element are substantially identical to those of the conventional battery pack protecting apparatus, so they are not described in detail here. Thus, the following explanation will be focused on essential features of the battery pack protecting apparatus according to the present invention, which are distinguishable from the conventional battery pack protecting apparatus.

As shown in FIG. 2, the battery pack protecting apparatus 200 according to the present invention further includes a diode 300 having one end connected to the sense resistor 210 and the other end connected to the fuse control switch 230. The diode 300 is connected such that electric current flows from the sense resistor 210 to a gate terminal of the fuse control switch 230. Preferably, the diode 300 is a Schottky diode. The sense resistor 210 generally has a resistance of 5 to 10 mΩ. In a normal case, though the battery pack terminal is short-circuited, a voltage over 1V is hardly applied to both ends of the sense resistor 210. However, if the sense resistor 210 is destructed due to various factors such as mechanical or electric impacts, impedance between both ends of the sense resistor 210 are increased, so a voltage difference between both ends of the sense resistor 210 is abnormally increased. According to the present invention, in case the voltage difference is increased over a predetermined level as mentioned above, a charging or discharging current is flowed through the Schottky diode 300, and as a result a gate voltage of the fuse control switch 230 is increased. Thus, the fuse control switch 230 turns on to melt and cut the fuse 240, and as a result an electric current is not flowed any more in the battery pack protecting apparatus. Preferably, the Schottky diode 300 turns on the fuse control switch 230 to melt and cut the fuse 240 when a voltage difference between both ends of the sense resistor 210 exceeds a critical value, for example 2V.

Figure 3:
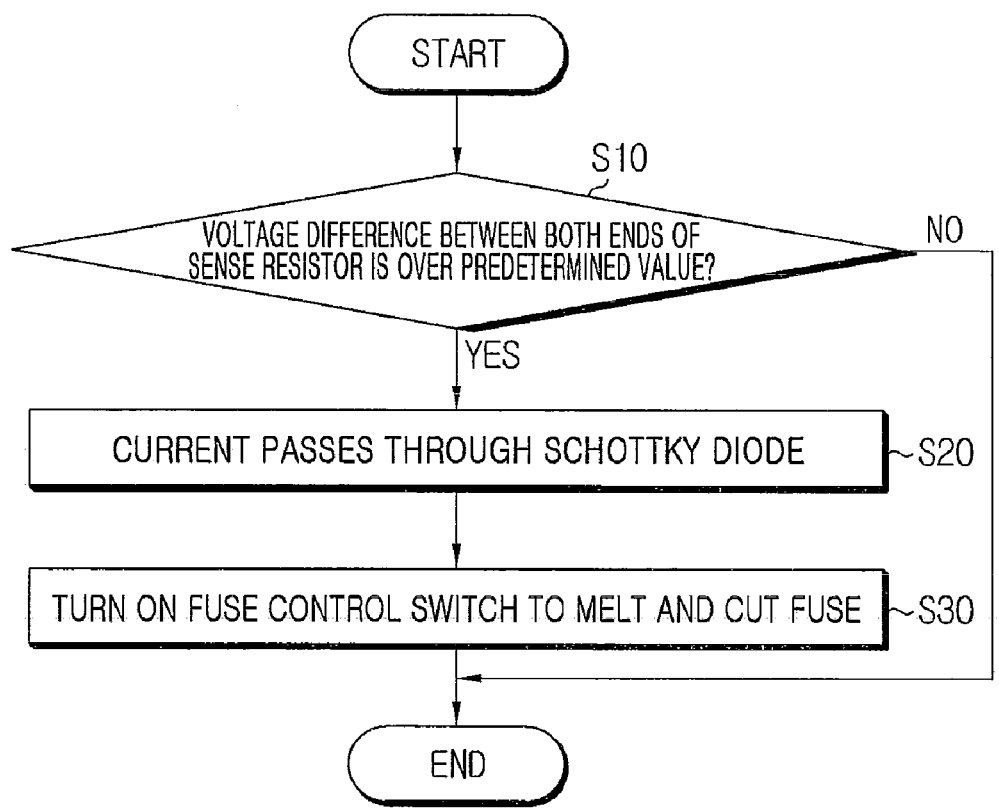
FIG. 3 is a flowchart illustrating a method for protecting a battery pack when a sense resistor of the battery pack protecting apparatus is destructed according to one embodiment of the present invention.

FIG. 3 is a flowchart illustrating a method for protecting a battery pack according to one embodiment of the present invention when a sense resistor of the battery pack protecting apparatus is destructed.

Referring to FIG. 3, in the method for protecting a battery pack according to the present invention, if the sense resistor is destructed, a voltage over a predetermined value is applied to both ends of the sense resistor (S10), and then a voltage over a threshold value is applied to the Schottky diode connected between the sense resistor and the fuse control switch such that electric current flows through the Schottky diode (S20). If electric current flows to the Schottky diode as mentioned above, the fuse control switch turns on to melt and cut the fuse (S30), thereby intercepting electric current in the battery pack. Also, as described with reference to FIG. 2, in case a voltage difference between both ends of the sense resistor is over 2V, electric current is preferably flowed to the Schottky diode to melt and cut the fuse.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. An apparatus for protecting a battery pack, comprising:
   a fuse and a sense resistor, connected on a circuit path along which a charging or discharging current flows;
   a fuse control switch for controlling the fuse; and
   a Schottky diode having one end directly connected to the sense resistor and the other end directly connected to the fuse control switch,
   wherein the Schottky diode allows electric current to flow to the fuse control switch when a voltage over a predetermined value is applied to both ends of the sense resistor, so that the fuse control switch turns on to melt and cut the fuse.

2. A battery pack, which includes the apparatus defined in the claim 1.

3. A method for protecting a battery pack, which includes a fuse and a sense resistor, connected on a circuit path along which a charging or discharging current flows, a fuse control switch for controlling the fuse, and a Schottky diode having one end directly connected to the sense resistor and the other end directly connected to the fuse control switch, the method comprising:
   (S1) allowing an electric current to flow toward the fuse control switch through the Schottky diode, in case a voltage over a predetermined value is applied to both ends of the sense resistor; and
   (S2) turning on the fuse control switch by the electric current to melt and cut the fuse.

\* \* \* \* \*